United States Patent [19]
Cutchaw

[11] 3,923,038
[45] Dec. 2, 1975

[54] SOLAR ENERGY COLLECTOR PANEL

[76] Inventor: John M. Cutchaw, 7333 E. Virginia, Scottsdale, Ariz. 85257

[22] Filed: July 18, 1974

[21] Appl. No.: 489,529

[52] U.S. Cl. .............................. 126/271; 165/105
[51] Int. Cl.² ............................................. F24J 3/02
[58] Field of Search ............ 126/270, 271; 165/105; 60/26; 237/1 A; 202/234

[56] References Cited
UNITED STATES PATENTS

| | | | |
|---|---|---|---|
| 2,872,915 | 2/1959 | Bowen | 126/271 |
| 2,993,125 | 7/1961 | Geer et al. | 126/271 |
| 3,502,138 | 3/1970 | Shlosinger | 165/105 |
| 3,621,906 | 11/1971 | Leffert | 165/105 |
| 3,799,144 | 3/1974 | Ramsey | 126/270 |
| 3,875,926 | 4/1975 | Frank | 126/271 |

Primary Examiner—Kenneth W. Sprague
Assistant Examiner—James C. Yeung
Attorney, Agent, or Firm—Herbert E. Haynes, Jr.

[57] ABSTRACT

A solar energy collector panel including a housing having a solar window therein and which contains a loop of tubing through which a fluid is pumped for heating of the fluid. A heat absorbing porous wicking membrane containing a vaporizable working liquid is positioned within the housing for collecting solar heat and transferring that heat to the fluid within the tubing. The working liquid is vaporized by solar energy and the vapor which contains latent heat will move toward and condense proximate the tubing to release the latent heat and thus transfer that heat to the fluid in the tubing. The condensed vapor, or working liquid is reabsorbed by the wicking membrane and is returned by wicking action to the vicinity of the solar window so that a continuous cycle of vaporization, condensation and liquid pumping takes place to efficiently collect and transfer heat.

15 Claims, 12 Drawing Figures

SOLAR ENERGY COLLECTOR PANEL

BACKGROUND OF THE INVENTION

1. Field of the Invention

This invention relates to the art of solar energy collectors and more particularly to an improved solar energy collector panel.

2. Description of the Prior Art

One of the problems which has kept solar energy operated devices from becoming economically competetive with fossil fuel operated devices is the relatively inefficient and costly mechanisms employed to collect solar energy. To collect enough solar energy to operate a device as simple as a domestic hot water heater has heretofore required a very large solar collector panel with the specific size being determined by such factors as climate and latitude at the point of use. The labor involved and the cost of building and installing these large solar collector panels has, along with other well known factors, resulted in very little utilization of solar energy operated devices.

Solar energy collector panels, although differing somewhat in construction details, have traditionally included a thermally insulated flat box shaped housing having a solar window of glass or plastic on its sun facing surface. The housing is provided with a thermally conductive collector surface below the solar window and this collector surface is usually formed of costly, heavy gauge sheet copper, aluminum or similar material. The collector surface is painted, plated or otherwise treated to produce a blackened surface for efficient heat absorption, and this black coloration has resulted in collector surfaces being sometimes referred to as a "black body." A heat absorbing fluid, usually water, is pumped through tubing provided in the interior of the housing to absorb the heat collected by the black body. The tubing is disposed in a multiplicity of loops or coils to form a tortuous fluid path so that the fluid will be in the vicinity of the black body a sufficient length of time to effect a transfer of the heat. The tubing may be integrally formed with the black body or otherwise in thermally conductive contact therewith.

Thus, it may be seen that the efficiency of these prior art solar collector panels is limited to the amount of heat which can be transferred by conduction. The thermal conductivity of the materials employed as well as the exposure time of the fluid to the heat of the black body are important factors which dictate the quality and quantity of the materials employed if a relatively efficient collector panel is to be produced. Therefore, the cost of labor, cost of materials, the physical size and relatively inefficient operation of these prior art solar collector panels has contributed substantially to the lack of wide spread usage of solar energy operated devices.

Therefore, a need exists for a new and improved solar energy collector panel which overcomes some of the problems of the prior art.

SUMMARY OF THE INVENTION

In accordance with the present invention, an improved solar energy collector panel is disclosed as including mechanism for employing the phenomena of evaporation, condensation and surface tension pumping of a liquid in a porous wick to transfer latent heat of vaporization continuously from a region of solar energy impingement to a relatively cool region containing a fluid to be heated. This phenomena is employed in the apparatus of the present invention to produce a solar energy collector panel of greatly improved operating efficiency when compared to prior art collector panels which rely on conduction for transfer of heat. Thus, to perform a given amount of work, the solar energy collector panel of the present invention can be smaller and less costly than was heretofore possible.

Briefly, the apparatus employed in the solar energy collector panel of the present invention includes a wicking membrane with a length of tubing adjacent the peripheral edges of the membrane. The tubing is adapted to allow passage of a heat absorbing fluid therethrough and a vaporizable working liquid is present within the wicking membrane. The tubing and the wicking membrane are hermetically sealed within an enclosing means which is ideally at least partially evacuated. The enclosing means is provided with a solar window so that solar heat energy will impinge on the wicking membrane and cause vaporization of the vaporizable working liquid therein. The vapor which results from the vaporization contains latent heat of vaporization and will move toward the tubing and will condense proximate the tubing. Condensation of the vapor will release the latent heat and the released heat is absorbed by the fluid moving through the tubing. The condensed vapor, or working liquid, in the vicinity of the tubing is reabsorbed by the wicking membrane and is pumped by surface tension, or wicking action, back to the region of the wicking membrane which is being subjected to solar impingement. Thus, a continuous cycle of vaporization, movement of the vapor, condensation and pumping of the working liquid takes place to produce a highly efficient means for collecting and transferring heat.

Accordingly, it is an object of the present invention to provide a new and improved solar energy collector panel.

Another object of the present invention is to provide a new and improved solar energy collector panel which is inexpensive to manufacture and has a high operating efficiency.

Another object of the present invention is to provide a new and improved solar energy collector panel which performs a given amount of work with a physically smaller panel than was heretofore possible.

Another object of the present invention is to provide a new and improved solar energy collector panel which employs the principle of evaporation and condensation of a vaporizable liquid to produce a unit having a highly efficient heat transfer.

Still another object of the present invention is to provide a new and improved solar energy collector panel which employs the principle of evaporation, condensation and pumping of a vaporizable liquid by surface tension in a porous wick to continuously transfer latent heat of vaporization from a region of the solar panel which is heated by solar energy to another region which is relatively cool due to a fluid being pumped therethrough so as to efficiently transfer the collected heat to the pumped fluid.

The foregoing and other objects of the present invention, as well as the invention itself, may be more fully understood from the following description when read in conjunction with the accompanying drawings.

DESCRIPTION OF THE PREFERRED EMBODIMENTS

Figure 1:
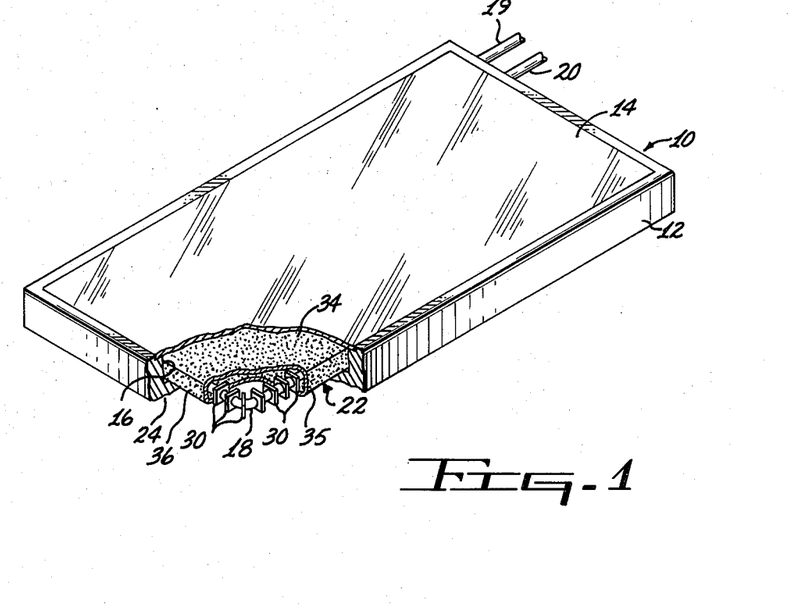
FIG. 1 is an isometric view of the solar energy collector panel of the present invention partially broken away to show a portion of the internal structure thereof.

Referring more particularly to the drawings, FIG. 1 illustrates a solar energy collector panel of the present invention which is indicated generally by the reference numeral 10. The panel 10 includes a housing 12 having a solar window 14 and an enclosed cavity 16 formed therein. A tube 18 is positioned within the cavity 16 of the housing 12 and is provided with an inlet 19 and an outlet 20 communicating exteriorly of the housing so that a suitable heat absorbing fluid 21, FIG. 3, such as air or water, can be pumped through the cavity 16 of the housing for absorbing the heat collected by the panel 10. A wicking membrane 22 containing a vaporizable working liquid is positioned within the cavity 16 of the housing 12 adjacent the solar window and extends into the vicinity of the fluid carrying tube 18. The wicking membrane 22 and the vaporizable liquid provide means for collecting the solar energy and transferring the heat produced thereby to the fluid 21 contained within the tubing 18, as will hereinafter be described in detail.

Figure 3:
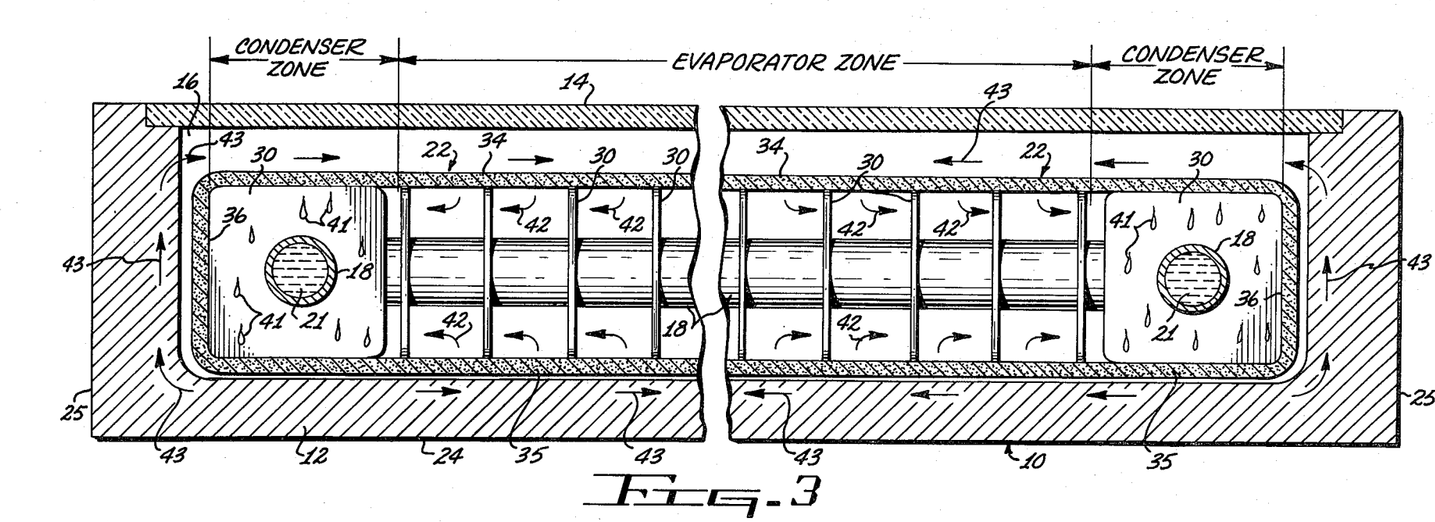
FIG. 3 is an enlarged sectional view taken on the line 3—3 of FIG. 2.
Figure 4:
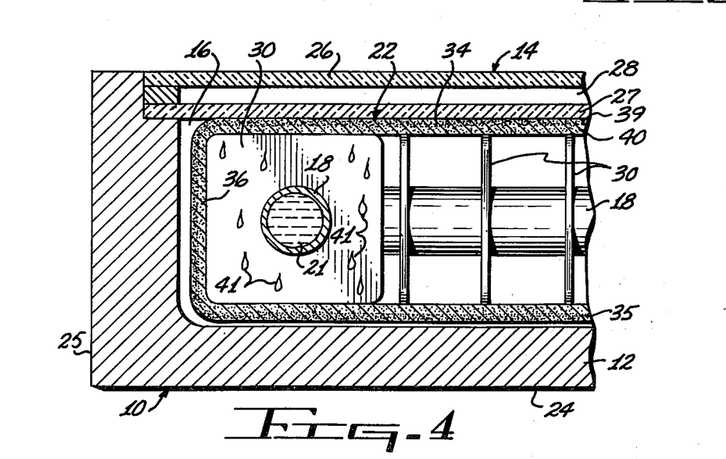
FIG. 4 is a fragmentary sectional view similar to FIG. 3 illustrating a modified form of a solar energy panel of the present invention.

The housing 12 is fabricated of suitable thermally insulative material and includes a bottom 24 with upstanding walls 25 configured so as to form the housing into a flat upwardly opening box shaped structure, having the cavity 16 therein. The upwardly extending ends of the side walls 25 of the housing are adapted to sealingly retain the peripheral edges of the solar window 14 so as to close the upwardly opening housing 12 thus inclosing the cavity 16 thereof. The solar window may be formed of any suitable transparent material, such as glass, plastic or the like. As is well known in the art, the solar window 14 may be formed of a single sheet of transparent material as shown in FIG. 3, or may include an outer sheet 26 and an inner sheet 27 with an insulative gap 28 therebetween as shown in FIG. 4. It should be noted that the inwardly facing surface of the transparent material forming the solar window 14 is ideally a wettable surface to prevent formation of condensation which could result in much heat loss due to reflective scattering of the incoming solar heat energy.

In any event, the housing 12 of this embodiment of the present invention is hermetically sealed and may be at least partially evacuated for reasons which will become apparent as this description progresses.

The tubing 18, through which the heat absorbing fluid 21 is pumped, is disposed within the cavity 16 of the housing 12 in a single loop so that each leg 29 (FIG. 2) of the loop is positioned adjacent a different one of the side walls 25 of the housing. The tubing 18 may be of conventional materials and design, however, it is preferred that the material be copper, aluminum or other suitable thermally conductive material, and that the tubing be provided with a plurality of incrementally spaced transverse fins 30 of any convenient shape such as square, or other suitable heat transfer elements may be employed. The fins 30 are employed for efficient conduction of heat to the heat absorbing fluid 21 moving through the tubing as will hereinafter be described in detail.

Figure 2:
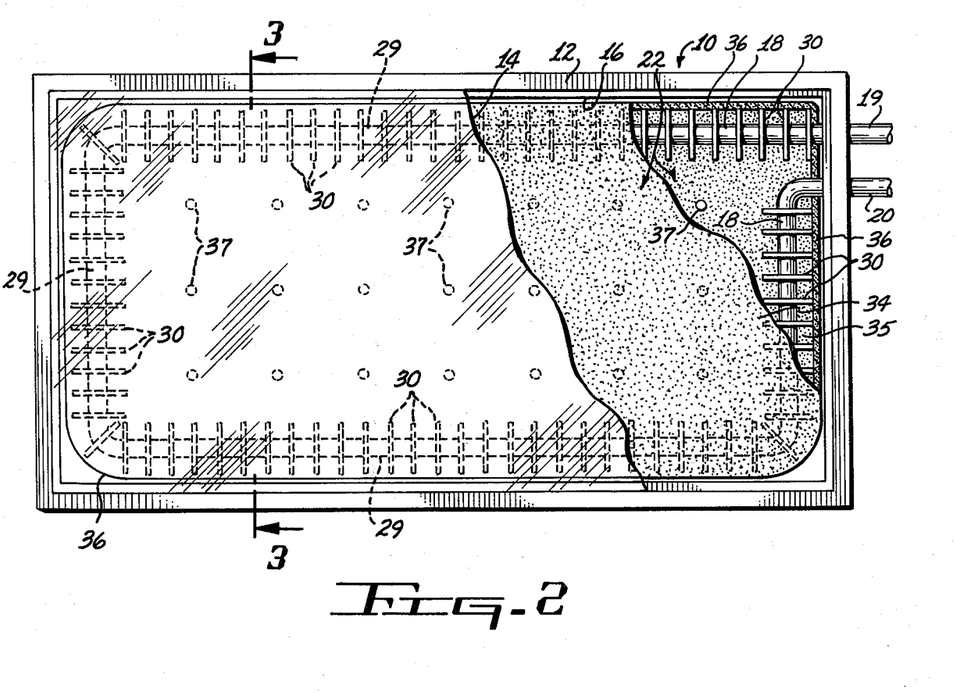
FIG. 2 is an enlarged plan view of the structure shown in FIG. 1 and is partially broken away to illustrate the various features thereof.

As seen best in FIGS. 2 and 3, the wicking membrane 22 in the preferred embodiment is an envelope like structure which substantially encloses that portion of the tubing 18 which is disposed within the cavity 16 of the housing 12. The wicking membrane 22 is formed of a unitary sheet of material formed to provide an upper surface 34, a lower surface 35 which is spaced from and substantially parallel to the upper surface 34, and an endless side wall 36 that extends between the peripheral edges of the surfaces 34 and 35. The wicking membrane 22 is positioned within the cavity 16 so that the upper surface 34 and the lower surface 35 are substantially parallel with respect to the solar window 14 of the housing 12 and are coextensive therewith. The loop of tubing 18 is positioned within the wicking membrane 22 so that the side wall 36 and the peripheral edges of the upper and lower surfaces 34 and 35 are in engaging contact with the fins 30 of the tubing 18.

The wicking membrane 22 is fabricated of a porous material such as a screen, cloth, felt, sintered powder and the like. A preferred form of wicking membrane is fabricated from a compressed sheet of shredded metal such as steel wool, copper wool, or aluminum wool.

Figure 5:
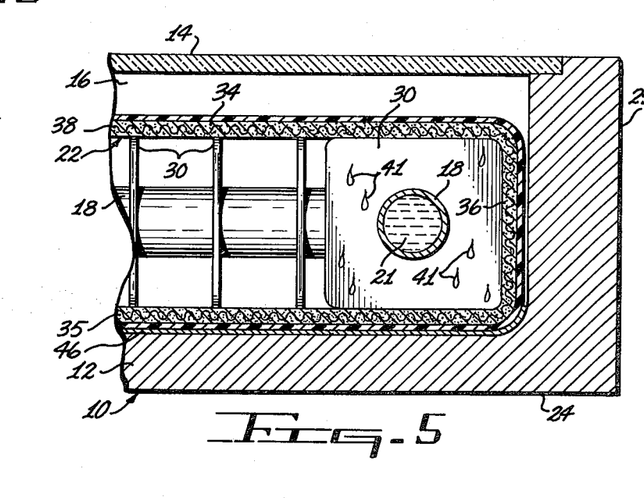
FIG. 5 is a fragmentary sectional view similar to FIG. 3 and illustrating another modified form of the apparatus of the present invention.

In the event that the wicking membrane 22 is formed of a pliable, or nonrigid material, means for supporting the membrane will be needed to prevent sagging thereof between the loop of tubing 18. FIG. 2 illustrates a plurality of spaced standards 37, such as of plastic, extending between the upper and lower surfaces 34 and 35 of the membrane 22 to prevent sagging thereof. As an alternative to the sag preventing standards 37, a suitable net 38 of tensioned fibers or metallic screening, as shown in FIG. 5, can be imbedded within the membrane 22, or could be suitably affixed to the inner surfaces thereof.

Since one function of the wicking membrane 22 is to collect solar heat energy, it is desirable that, as shown in FIG. 4, the outwardly facing surface 39 of the membrane 22 be colored black for efficient absorption of heat. As will hereinafter be described in detail, the wicking membrane 22 may have its inwardly facing surfaces 40 colored silver or white for heat reflecting purposes.

A vaporizable working liquid 41, shown as droplets on the fins 30 of the tubing 18, is contained within the wicking membrane 22. The operating temperature of the solar energy collector panel 10 is determined largely by the type of working liquid employed as will hereinafter be described in detail.

OPERATION

The operating principles of the solar energy collector panel 10 of the present invention are similar to the well known operating principles of a device sometimes referred to as a "heat pipe." In both the panel 10 and "heat pipe," vaporization, condensation and surface tension pumping of a working liquid in a porous wick are employed to transfer latent heat of vaporization continuously from one region to another without the aid of external work. A detailed report on the operating principles and design parameters of heat pipes was published in the Mar. 18, 1974 issue of Design News in an article commencing on Page 159 entitled, "Designer's Guide to Heat Pipes."

As hereinbefore stated, the working liquid 41 is present within the wicking membrane 22, and the upper surface 34 thereof acts as an evaporator zone due to impingement of solar heat energy thereon. The impinging solar heat energy will vaporize the working liquid 41 present in the evaporator zone which causes a pressure differential to be created between the evaporator zone and the area proximate the tubing 18. The area proximate the tubing 18 acts as a condenser zone due to the relatively lower temperature maintained in that zone by the movement of the heat absorbing fluid 21 through the tubing. The vapor produced in the evaporator zone will exit from the wicking membrane 22 and will move, as indicated by arrows 42 in FIG. 3, toward the condenser zone due to the pressure differential existing between the two zones. The vapor will be condensed in the condenser zone due to the lower temperature and will thus release the latent heat of vaporization. The heat thus transferred to the condenser zone will be picked up by the fins 30 of the tubing which in turn conducts the heat to the fluid 21 within the tubing. The vapor condensed in the condenser zone is reabsorbed by the wicking membrane 22 and will move by surface tension pumping, or wicking action, back to the evaporator zone as indicated by arrows 43. In some climates, the intensity of the incoming solar heat energy will be sufficient to cause evaporation of the working liquid 41 to take place in the lower surface 35 of the wicking membrane which would cause both the upper and lower surfaces 34 and 35 to act as the evaporator zone.

It may now be seen that if the incoming solar energy is intense enough to cause the working liquid to boil, a continuous cycle of vaporization, condensation and surface tension pumping will occur. Thus, the working liquid can be selected to suit a particular climate. For example, ethyl chloride ($CH_3CH_2Cl$) will boil at approximately 54°F and would be suitable in relatively cold climates, while water, which of course boils at 212°F, would be ideal for use in mild and warm climates.

As hereinbefore stated, the solar window 14 of the housing 12 may be formed of a single sheet of transparent material as shown in FIG. 3, or a double spaced apart pair of sheets 26 and 27 as shown in FIG. 4. An alternate form of solar window structure having additional benefits is shown in FIG. 5 wherein a wrapper 44 of transparent material such as plastic completely surrounds the wicking membrane 22 and is in contiguous engagement with the outwardly facing surface of the membrane. The wrapper 44 will prevent formation of condensation by virtue of its being in engagement with the wicking membrane 22 which will absorb any condensation droplets attempting to form. The wrapper 44 will also act as a vapor barrier in that the vapor produced in the evaporator zone will be forced to exit the membrane 22 in an inwardly moving direction. The wrapper 44 may be provided with a pressure equalizing aperture to prevent excessive build up from occurring within the wrapper.

It should be noted that instead of forming the wrapper 44 of a transparent material, material having a suitable heat absorbing coloration could be employed in which case the same benefits of a vapor barrier and condensation preventative would be achieved and the wrapper would function as a heat absorbing black body rather than as a solar window. Further, the benefits of a vapor barrier and condensation preventative can be achieved as shown in FIG. 4, by placing the inwardly disposed surface of the solar window 14 in contiguous engagement with the upper surface 34 of the wicking membrane 22.

It should now be readily apparent that the inner surfaces 40 of the wicking membrane 22 are ideally provided with a heat reflecting coloration, such as silver or white, so that the latent heat released during condensation of the vapor will be reflectively contained within the membrane 22.

As hereinbefore mentioned, the housing 12 is hermetically sealed which may now be seen to be necessary so that the vapor produced will not pass off into the atmosphere. Although not absolutely necessary, the efficiency of the solar panel 10 will be substantially increased by at least partially removing the air, or evacuating, the cavity 16 of the housing 12 so that vapor movements will be unrestricted.

Figures 6, 7:
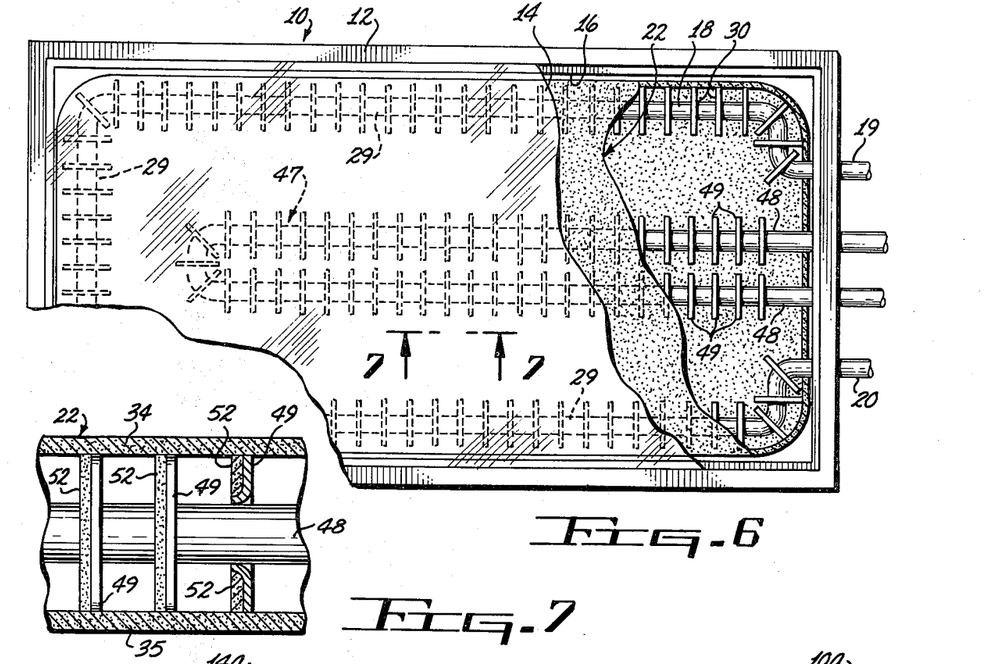
FIG. 6 is a plan view of the solar energy collector panel of the present invention which illustrates an optional feature which may be incorporated in that panel.
FIG. 7 is an enlarged fragmentary sectional view taken on the line 7—7 of FIG. 6.

As seen best in FIG. 2, the loop of tubing 18 within the housing 12 results in a relatively large area between the legs 29 thereof. This area may be usefully employed, as shown in FIG. 6, by including an auxiliary heat mechanism 47 therein. This auxiliary heat mechanism 47 would ideally obtain heat from a nonsolar source and can be employed to put otherwise wasted heat to good use. The auxiliary heat source mechanism 47 is illustrated as a loop of tubing 48 having a plurality of fins 49 thereon as was previously described with reference to the tubing 18, and the fins 30 thereof. Since solar energy collector panels are usually mounted on roof tops, it is intended that the auxiliary heat source mechanism 47 be coupled to utilize wasted heat within a chimney flue (not shown), heater vent stack (not shown), or the like. Usage of an auxiliary heat source means would be particularly useful as a suplementary heat source, and would be ideal in cold climates where waste heat could be employed at night or during sunless periods to prevent formation of ice on the solar window that could delay commencement of normal solar operation in the daytime or when the sun comes out. Employing the auxiliary heat source mechanism 47 as described would also insure that portions of the wicking membrane 22 would not dry out during extended periods of inactivity.

To prevent the auxiliary heat source mechanism 47 from acting as a condenser zone during periods of normal solar operation, a thermostatically controlled shut-off valve (not shown) would be installed in the line which couples the heat source to the tubing 48 to stop flow of any fluid that would absorb and carry away the heat produced by impinging solar heat energy.

It should be noted that the tubing 48, although shown as a loop, could be simply passed through the cavity 16 of the housing 12, and exhausted to atmosphere. Also, another form of auxiliary heat source could be used in the form of an electrically operated heater having suitable thermostatic controls (not shown).

Although the fins 49 of the auxiliary heat source mechanism 47 will function quite efficiently when fabricated of metal, the operating efficiency can be improved by providing a wicking pad 52, as shown in FIG. 7, on one or both of the surfaces of each of the fins 49. In this manner, the working liquid 41 present in the wicking membrane 22 will also be present in the wicking pads 52. The heat of the auxiliary heat source mechanism 47 will cause the working liquid present in the pads 52 to boil and go off as a vapor containing latent heat, and the vapor will migrate to the relatively cooler areas of the solar panel 10. An additional advantage of the wicking pads 52 is that when the auxiliary heat mechanism 47 is inoperative, as hereinbefore described, the pads 52 will serve as paths through which the working liquid is pumped by wicking action back to the evaporator zone of the wicking membrane.

Figure 8:
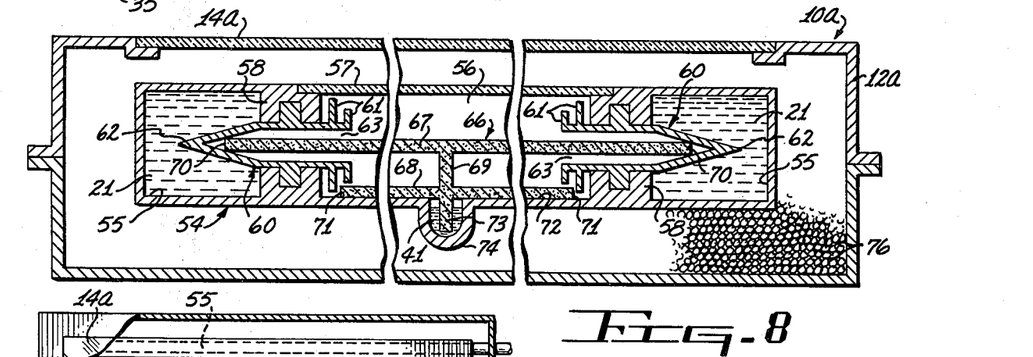
FIG. 8 is a sectional view similar to FIG. 3 and illustrating another embodiment of the solar energy collector panel of the present invention.
Figure 9:
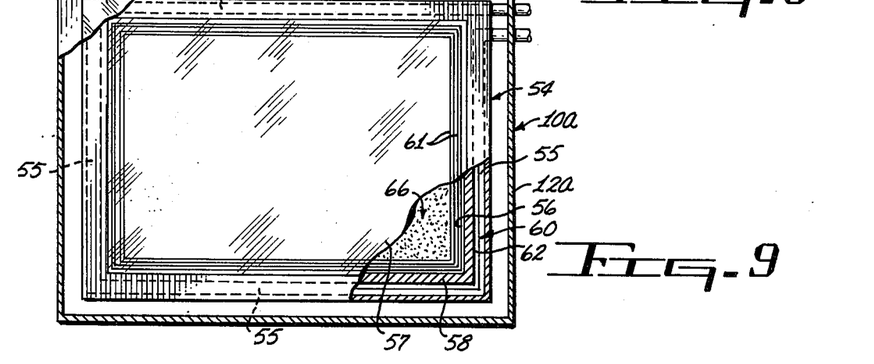
FIG. 9 is a plan view of the apparatus shown in FIG. 8.

Referring now to FIGS. 8 and 9 wherein a modification of the present invention is shown as including a solar collector panel indicated generally by the reference numeral 10a. In this embodiment, the housing 12a is a simplified box shaped enclosure, having the solar window 14a, and which need not be hermetically sealed and does not require any evacuation. The housing 12a simply acts as a supporting and protecting structure for a unitary case 54 containing all the necessary elements to function as hereinbefore described. The case 54 includes peripherally disposed passage 55 which is in a loop configuration similar to the previously described tubing 18, and is intended to function in the same manner by carrying the heat absorbing fluid 21. The case 54 is formed with a hermetically sealed central cavity 56 which is formed in the same plane as the fluid passage 55 and is within the loop formed by the passage. The central cavity 56 is hermetically sealed and is at least partially evacuated and has a suitable sheet 57 of transparent material which forms the upwardly facing wall thereof. An endless side wall 58 surrounds the central cavity 56 and separates the cavity from the fluid carrying passage 55. An elongated heat transfer element 60 is embedded in the wall 58 and has heat collecting fins 61 on the side thereof which protrudes into the central cavity 56 and is formed with a heat radiating probe 62 on the opposite side thereof which extends into the fluid passage 55. The heat transfer element 60 is suitably sealingly mounted within the wall 58 to prevent leakage from the fluid passage 55 into the central cavity 56 and is formed with a channel 63 which opens between the fins 61 and extends into the probe 62 and is closed proximate the probe. A wicking membrane 66 is positioned within the central cavity 56 so as to be substantially parallel and coextensive with the transparent sheet 57 which forms the solar window of the case 54. The wicking membrane 66 of this embodiment comprises an upper sheet 67 and a lower sheet 68 which are suitably interconnected at at least one intermediate location by a web 69 of similar material. The peripheral edges 70 of the upper sheet 67 of the wicking membrane 66 extend into the channel 63 of the heat transfer element 60 and the peripheral edges 71 of the lower sheet 68 are positioned proximate and below the fins 61 of the heat transfer element. The lower sheet 68 of the wicking membrane 66 is in contiguous contact with the bottom surface 72 of the central cavity 56, and is provided with a tail 73 of wicking material which depends from the lower sheet 68 into a trough 74 formed in the bottom surface 72. The trough 74 serves as a reservoir for the working liquid 41 which is present in the wicking membrane 66 as hereinbefore described in reference to the wicking membrane 22 of the previously described embodiment.

It may now be seen that central portion of the upper sheet 67 of the wicking membrane 66 acts as an evaporator zone and the heat transfer element 60 acts as a condenser zone for efficiently transferring latent heat of vaporization to the fluid 21 within the passage 55. The lower sheet 68 of the wicking membrane 66 will absorb the working liquid 41 which is condensed proximate the heat transfer element 60 and by means of the web 69 will pump the liquid 41 back to the upper sheet 67 of the membrane.

By fabricating the solar collector panel 10a with the unitary case 54 as described above, the housing 12a may be formed in any desired configuration and of any desired materials. Also, the unitary case 54 may be protected from damage such as could occur from storms and the like. A desirable method of mounting the unitary case 54 within the housing 12a is to surround the case within a plurality of transparent evacuated bubbles 76 such as of plastic which serve as a thermal insulator as well as a shock insulator.

Figure 10:
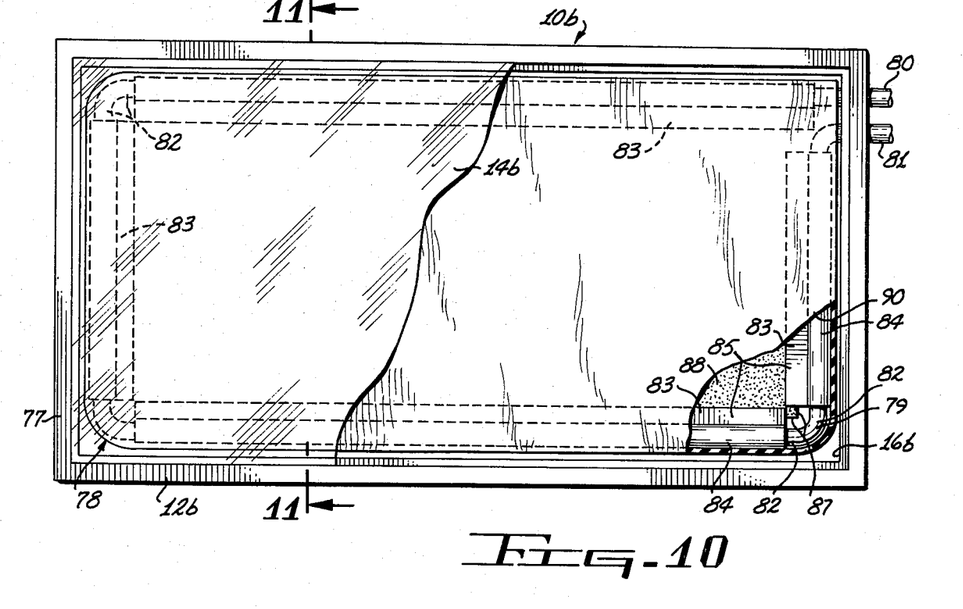
FIG. 10 is a plan view of another embodiment of the solar energy collector panel of the present invention partially broken away to illustrate the various features thereof.
Figure 11:
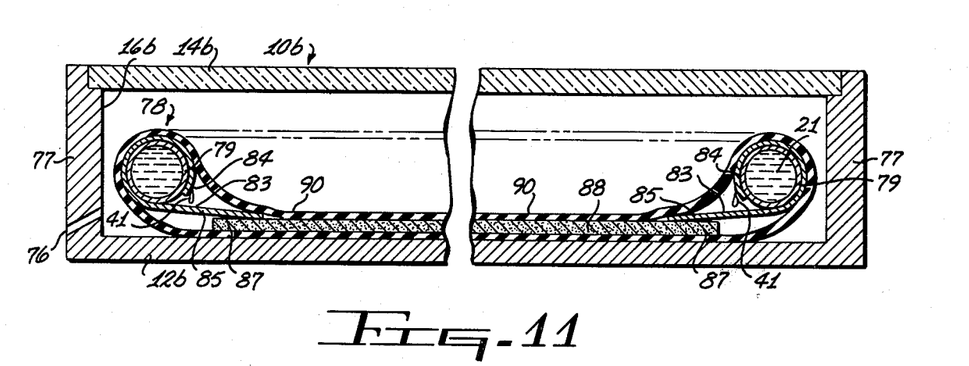
FIG. 11 is a sectional view taken on the line 11—11 of FIG. 10.

A cost reduced embodiment of the present invention is illustrated in FIGS. 10 and 11 wherein the solar heat collector panel of the present invention is indicated generally by the reference numeral 10b. In this embodiment, the collector panel 10b employs a simplified housing 12b which, as previously described with reference to the collector panel 10a, need not be hermetically sealed, need not be evacuated, can be of any suitable configuration and should ideally by of thermally insulative material for efficient operation. The housing 12b is provided with a solar window 14b which encloses a cavity 16b, and the cavity is vented to the atmosphere by forming an aperture 76 through the side wall 77 of the housing.

A simplified unitary case 78 is positioned within the cavity 16b of the housing 12b and is shown to include a loop of tubing 79 having an inlet 80 and an outlet 81 communicating exteriorly of the housing 12b. Each of the legs 82 of the tubing 79 is provided with an elongated heat transfer element 83, each of which is shown to include a sleeve member 84 that partially circumscribes the tubing 79 and an extending apron portion 85. The apron portions 85 of the heat transfer elements 83 extend inwardly into the central area circumscribed by the loop of tubing 79 and into engagement with the peripheral edges 87 of a wicking membrane 88 positioned in this area. The wicking membrane 88 of this embodiment is formed of a single sheet of suitable wicking material and, as previously described, a working liquid 41 is present within the membrane. A hermetically sealed envelope 90 which is at least partially evacuated is provided to sealingly enclose the loop portion of the tubing 79 and will thus also enclose the heat transfer elements 83 and the wicking membrane 88. The envelope 90 is fabricated of an elastic resilient material which may either be colored black or transparent. Material suitable for the envelope 90 may be Neoprene or any of the well known plastic materials.

With the envelope 90 being partially evacuated, as previously described, the envelope will assume the collapsed position shown in solid lines in FIG. 11 during periods of inactivity and will expand into the dashed line position when the impinging solar heat energy causes the working liquid 41 in the membrane 88 to expand into its vaporous state. The continuous cycle of evaporation, condensation and surface tension pumping of the working liquid takes place as previously described.

Figure 12:
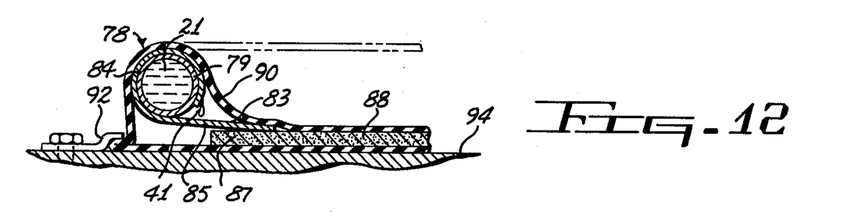
FIG. 12 is a fragmentary sectional view similar to FIG. 11 and illustrating a modification of the apparatus shown in that figure.

In some installations, the use of the housing 12b may not be desirable or needed, thus, the unitary case 78 may be provided with suitable tie down lugs 92 as shown in FIG. 12. In this manner, the unitary case 78 may be directly mounted to a suitable supporting structure 94 such as a roof top.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A solar energy collector panel for collecting solar heat energy and transmitting that heat to a heat absorbing fluid, said solar energy collector panel comprising:
    a. a wicking membrane of planar configuration;
    b. passage means having an inlet and an outlet, said passage means configured for positioning adjacent the periphery of said wicking membrane and shaped to substantially conform therewith, said passage means adapted to allow movement of a heat absorbing fluid therethrough;
    c. a vaporizable working liquid in said wicking membrane, said working fluid adapted to be vaporized upon impingement of solar heat energy on said wicking membrane with the resulting vapor movable toward said passage means for condensation proximate said passage means; and
    d. means for enclosing said passage means and said wicking membrane for hermetic sealing thereof, said means adapted to expose at least the central portion of said wicking membrane for impingement of solar heat energy thereon.

2. A solar energy collector panel as claimed in claim 1 further comprising at least one heat transfer element in thermally conductive contact with said passage means for transferring the latent heat released by the condensing vapor to the heat absorbing fluid movable through said passage means.

3. A solar energy collector panel as claimed in claim 1 wherein said passage means comprises:
    a. a length of tubing of thermally conductive material formed into a loop shaped configuration; and
    b. a plurality of radially extending fins of thermally conductive material mounted in spaced increments along the length of said tubing.

4. A solar energy collector panel as claimed in claim 1 wherein said passage means comprises:
    a. a length of tubing of thermally conductive material formed into a loop shaped configuration; and
    b. at least one heat transfer element of thermally conductive material on said tubing, said heat transfer element including a sleeve member substantially circumscribing said tubing and in thermally conductive contact therewith and an integral apron portion extending from said sleeve member into contact with the peripheral edges of said wicking membrane.

5. A solar energy collector panel as claimed in claim 1 further comprising an auxiliary heat mechanism extending into said means for enclosing said passage means and said wicking membrane for supplying heat from a nonsolar source, said auxiliary heat mechanism positioned adjacent said wicking membrane.

6. A solar energy collector panel as claimed in claim 1 wherein said wicking membrane is formed of a unitary sheet of porous wicking material which is configured into an envelope like structure that substantially encloses said passage means with the peripheral edges of said wicking membrane in contact with said passage means.

7. A solar energy collector panel as claimed in claim 6 further comprising a wrapper of transparent material in contiguous engagement with the outwardly facing surfaces of said wicking membrane.

8. A solar energy collector panel as claimed in claim 6 further comprising a wrapper of heat absorbing coloration in contiguous engagement with the outwardly facing surfaces of said wicking membrane.

9. A solar energy collector panel as claimed in claim 6 wherein said wicking membrane has a heat absorbing coloration on the outwardly facing surfaces thereof and a heat reflecting coloration on the inwardly facing surfaces thereof.

10. A solar energy collector panel as claimed in claim 1 wherein said wicking membrane is formed of porous wicking material and has an upper sheet and a lower sheet, said upper and lower sheets substantially parallel with respect to each other and spaced apart, said upper and lower sheet interconnected by at least one web of porous wicking material with said web positioned at an intermediate point.

11. A solar collector panel as claimed in claim 1 wherein said means for enclosing said passage means and said wicking membrane is at least partially evacuated.

12. A solar energy collector panel as claimed in claim 1 wherein said means for enclosing said passage means and said wicking membrane comprises:
    a. a housing of thermally insulative material having an upwardly opening cavity formed therein in which said passage means and said wicking membrane are positioned with the inlet and the outlet of said passage means sealingly extending from the cavity exteriorly of said housing; and b. solar window means sealingly mounted within the opening of the upwardly opening cavity formed in said housing for hermetically sealing that cavity.

13. A solar energy collector panel as claimed in claim 1 wherein said means for enclosing said passage means and said wicking membrane comprises:

a. a case having a peripherally disposed passage formed therein with an inlet and an outlet exiting from said case, the peripherally disposed passage formed into a substantially loop shaped configuration to provide said passage means, said case having an upwardly opening central cavity formed therein in which said wicking membrane is positioned with the cavity being disposed within the loop formed by the peripherally disposed passage, said case having an endless wall surrounding the central cavity for separating the peripherally disposed passage therefrom; and b. solar window means sealingly mounted within the opening of the upwardly opening central cavity formed in said case for hermetically sealing that cavity.

14. A solar energy collector panel as claimed in claim 13 further including at least one heat transfer element embedded in the endless wall of said case and extending into both the central cavity and the peripherally disposed passage of said case.

15. A solar energy collector panel as claimed in claim 1 wherein said means for enclosing said passage means and said wicking membrane comprises a hermetically sealed envelope of elastic resilient material which is at least partially evacuated so that said envelope will expand from a collapsed state to an expanded state when impinging solar energy causes vaporization of said vaporizable working liquid.

* * * * *